United States Patent [19]

DeCarlo et al.

[11] 4,291,108

[45] Sep. 22, 1981

[54] PRODUCTION OF β-ALUMINA CERAMIC TUBES

[75] Inventors: Vincent J. DeCarlo, Clifton Park; Robert W. Powers, Schenectady; Stephan P. Mitoff, Clifton Park, all of N.Y.

[73] Assignee: General Electric Company, Schenectady, N.Y.

[21] Appl. No.: 180,601

[22] Filed: Aug. 25, 1980

[51] Int. Cl.$^3$ .................. H01M 2/00; F27D 3/00
[52] U.S. Cl. .................. 429/193; 432/11; 432/239
[58] Field of Search .............. 432/11, 19, 239; 13/21; 429/193

[56] References Cited

U.S. PATENT DOCUMENTS 4,070,542  1/1978  Miles et al. .................. 13/26

FOREIGN PATENT DOCUMENTS 2446566  4/1975  Fed. Rep. of Germany ...... 432/239
1297373  11/1972  United Kingdom .

*Primary Examiner*—John J. Camby
*Attorney, Agent, or Firm*—Jane M. Binkowski; James C. Davis, Jr.; Leo I. MaLossi

[57] ABSTRACT

A sintered β-alumina cylindrical tube of uniform shape is produced by placing the unsintered tube within a sagger, passing the sagger on friction-reducing balls through a horizontal firing tube and continuously alternately rotating the tube-containing sagger through the firing tube so that all portions of the tube therewithin experience on the average the same gravitational effect.

20 Claims, 4 Drawing Figures

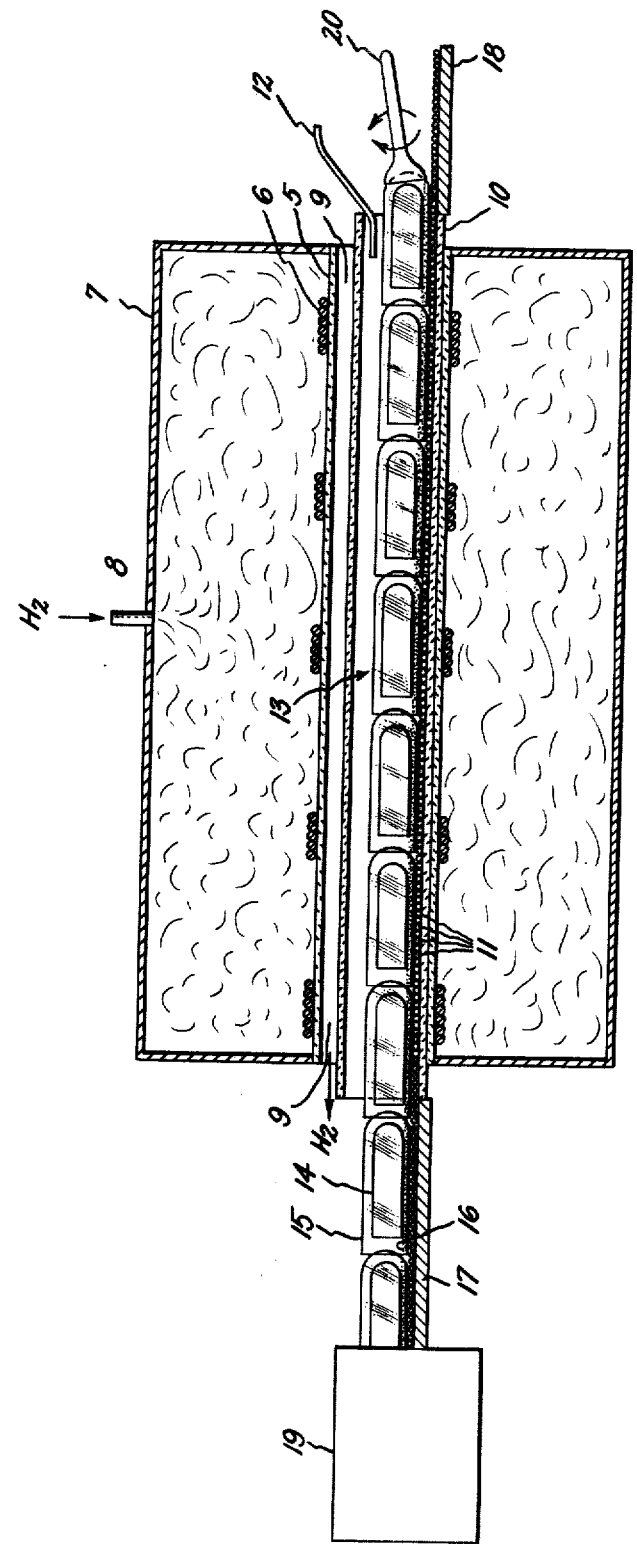
FIG. 1.
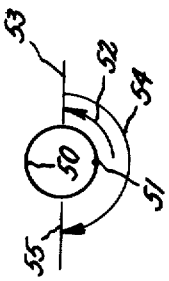
FIG. 4.
FIG. 3.
FIG. 2.

PRODUCTION OF β-ALUMINA CERAMIC TUBES

This invention relates to the elimination or substantial reduction of ovality or out-of-roundness in the production of sintered polycrystalline hollow ceramic tubes, particularly β-alumina tubes.

β-alumina as used herein includes β''-alumina, and it can be composed of a wide range of non-stoichiometric compounds of soda and alumina, i.e. $Na_2O.11Al_2O_3$ to $Na_2O.5Al_2O_3$. The β-alumina may also contain oxides such as those of magnesium and lithium.

Sintered thin-walled tubes of high density polycrystalline β-alumina are required for use as a solid electrolyte in sodium-sulfur cells. For such use, the tubes should be of uniform composition and roundness.

Conventional sintering techniques are usually not satisfactory for producing β-alumina tubes because with them temperatures must be closely controlled requiring a slow heating step which may effect density and cause variations in the composition of the sintered products.

British Pat. No. 1,297,373 to Miles et al. discloses the sintering of tubular or disc-shaped β-alumina articles by passing the articles through a horizontal tubular furnace having a short sintering zone thereby resulting in rapid heating and a short firing time.

U.S. Pat No. 4,070,542 also to Miles et al. discloses the production of β-alumina articles by passing the shaped piece through a continuously rotating horizontal tubular furnace having a short sintering zone.

In using a stationary horizontally-disposed sintering tube for the firing of β-alumina tubes, it has been found that excessive friction occurs between the sintering tube and the saggers containing the β-alumina tubes. When firing β-alumina tubes of about 2 centimeters diameter or larger, the friction was so great that the stoker mechanism used suitably for pushing the saggers containing 1 centimeter diameter tubes through the furnace was inadequate. Also, when the diameter of the β-alumina tubes was greater than about 2 centimeters, the resulting sintered ware showed significant ovality or out-of-roundness which increased substantially with the diameter of the ware. For example, the out-of-roundness or diameter variation was much worse with 2.8 centimeters diameter tubes than with those of 1.0 centimeter diameter. Specifically, if the cross-section of the tube is viewed as an ellipse, the major axis often exceeds the minor one by 8 to 10%. It can be inferred that out-of-roundness is caused by gravitational sag because the minor axis is aligned along the vertical direction. The tube is pushed in along the vertical direction and pulled out along the horizontal. Ovality complicates assembly of β-alumina tubes in sodium-sulfur cells and most likely will also interfere with performance. It is usually accompanied by bending of the tube. Both ovality and bending lead to a deleterious non-uniform current density over the surface of β-alumina tubes in operation in electrochemical cells.

Ser. No. 180,600, filed Aug. 25, 1980 entitled PRODUCTION OF β-ALUMINA CERAMIC TUBES filed of even date herewith in the names of R. W. Powers and S. P. Mitoff and assigned to the assignee hereof, and incorporated herein by reference, discloses that a sintered hollow tube of uniform shape is produced by placing the unsintered tube within a sagger, passing the sagger on friction-reducing balls through a horizontal firing tube and rotating the tube-containing sagger in a single direction through the firing tube.

It has been found that with rotation of the saggers in one direction the balls tended at times to build up on one side of the firing tube. This situation then allowed a sagger to fall off the balls and to make direct contact with the firing tube. Such not only greatly increased friction but also frequently led to cracking of the firing tube. The severity of the problem was found to depend on the ball size and on the rate of rotation. The problem is more severe with larger diameter balls, e.g. about 7 millimeters than with smaller diameter ones, e.g. about 2.5 millimeters. It also appears to have been more severe with manual rotation than when rotation is accomplished very uniformly with an electric motor. Manual rotation must of necessity be somewhat jerky in character.

The problem of ball build-up is overcome by the present invention in which the direction of rotation is alternated in a particular manner which exposes on the average all portions of the tube within the sagger to all angular positions on the average for the same amount of time.

Broadly, alternate rotation introduces a number of complexities which need be recognized and taken into account. The gist of these complications is that certain alternate rotation schemes bias some angular positions of the tube undergoing sintering over others. This tends to defeat the purpose of alternate rotation which is to expose any arbitrary point on the circumference of the tube to all angular positions for substantially the same amount of time. In addition, the sagger and tube contained therein generally do not rotate the same number of degrees. The rotation of the green tube may be greater by a factor up to the ratio of the inner diameter of the sagger to the outer diameter of the ware. However, if there is an excess of bedding powder in the sagger, ware and sagger usually rotate about the same number of degrees. One must remain mindful that it is the sagger, rather than the ware, the rotation amplitude of which is directly controlled.

In the present invention, two classes, i.e. embodiments, of alternating rotational variations are used. Each embodiment subjects all portions of the tube within the sagger on the average to the same gravitational effect. In one embodiment, rotation and counter-rotation of the tube within the sagger is carried out to the same number of degrees. In the other embodiment, the degrees of rotation of the tube within the sagger are unequal. It is desirable to rotate ware, i.e. the tube to be sintered, several times in the course of traversing the sintering zone of the firing tube. In both embodiments, experience teaches that a rough lower limit on the rotation rate of the tube to be sintered is about one turn (360 degrees) of the tube in a traverse distance equal to its circumference, i.e. $\pi D$ where D is the diameter of the tube to be sintered. The upper limit is determined by the ware breakage rate. Rotation is at least sufficiently uniform so that all portions of the tube within the sagger are subjected on the average to the same gravitational effect.

In the embodiment with equal rotational amplitudes, the tube within the sagger should be alternately turned, e.g. rotated, in integral multiples of half-turns of the tube to expose an arbitrary point on the tube circumference to all angular positions for equal times. However, with rotational amplitudes significantly in excess of a full turn of the tube, there is increasing risk of ball build-up. With an amplitude less than a half-turn of the tube, e.g. a quarter turn, some angular positions are never assumed by the ware. On the other hand, with non-integral multiples of a half-turn, e.g. ¾ of a turn, there is severe biasing of some angular positions over others. Preferably, in the equal rotational amplitude embodiment, the tube within the sagger is alternately turned a half-turn, e.g. 180°, or a complete turn, e.g. 360°.

The embodiment of non-equal alternating rotational amplitudes is less preferred than that of equal ones. With rotational amplitudes significantly in excess of a full turn of the tube within the sagger, e.g. 360°, there is increasing risk of ball build-up. In the embodiment of non-equal alternating rotational amplitudes, the lower limit is that required to cause the balls to return to the bottom of the firing tube, and it is approximately a quarter turn of the tube within the sagger, e.g. 90°. Also, in this non-equal embodiment, if neither amplitude is an integral multiple of a half-turn, e.g. of 180°, then it is important that the difference in amplitudes not amount to an integral multiple of a half-turn, e.g. of 180°. For example, the combination of a ¼ rotational amplitude of the tube within the sagger, e.g. 90°, and a ¾ counter-rotational amplitude, e.g. 270°, is undesirable because it leads to severe biasing of some angular positions of the tube to be sintered.

In each embodiment of the present invention, the required rotation and counter-rotation of the tube within a sagger is determinable empirically by proper rotation and counter-rotation of the sagger.

Briefly stated, the present method for producing a sintered polycrystalline ceramic hollow cylindrical tube without significant out-of-roundness comprises shaping ceramic powder into a hollow green tube, providing a cylindrical sagger open at least on one end and having an inner volume at least sufficient to accommodate said green tube horizontally and allow said tube to rotate therein, disposing said green tube horizontally within said sagger, providing a substantially horizontally-disposed open-ended firing tube containing a sintering zone, providing a layer of friction-reducing spheres in the lower portion of said horizontally-disposed firing tube along the length thereof, providing said firing tube with an atmosphere which has no significant delerious effect on said tube being sintered, heating said sintering zone to a sintering temperature, passing said tube-containing sagger through said firing tube on said spheres, continuously and simultaneously advancing and alternately rotating said tube-containing sagger through said firing tube so that all portions of said tube therewithin are exposed to at least substantially the same gravitational effect, said alternate rotation having no significant deleterious effect on said tube within said sagger, one completed alternate rotation being comprised of a rotation and a counter-rotation is predetermined amounts, the angles of all said rotations being substantially equal, the angles of all said counter-rotations being substantially equal, the rate of said alternate rotation being at least sufficient to make at least one completed alternate rotation of said tube within said sagger in an advancing distance equivalent to the outer circumference of said tube within said sagger, said tube-containing sagger being passed through said sintering zone at a rate appropriate to sinter said tube therewithin.

Those skilled in the art will gain a further and better understanding of the present invention from the figures accompanying and forming part of the specification, in which:

FIG. 1 illustrates the present process and also shows a diagrammatic section through one embodiment of a tubular furnace for sintering the present tubes, particularly β-alumina tubes.

FIG. 2 illustrates one embodiment of the present invention where the tube being sintered is alternately rotated in equal amounts of about 180° from the same predetermined position.

FIG. 3 illustrates one embodiment of the present invention wherein the tube being sintered is alternately rotated in equivalent amounts of about 360° from the same predetermined position.

FIG. 4 shows an embodiment of the present invention wherein the degrees of rotation of the tube being sintered are unequal.

Referring to FIG. 1, there is shown a tubular sintering furnace core 5, which in this particular embodiment is porous and can be made of polycrystalline α-alumina. The furnace core 5 is wound with a resistance heating wire 6, such as molybdenum wire. The furnace core 5 and wire 6 are disposed within housing 7, preferably a stainless steel housing containing alumina brick and powder insulation. Housing 7 has an inlet 8 for introducing hydrogen gas which passes through the housing and flows through the porous furnace core and is burned off at the open ends 9. Firing tube 10 is disposed within furnace core 5 and is made of a material sufficiently dense to prevent penetration by the hydrogen. Specifically, since β-alumina must be sintered in a non-reducing atmosphere, preferably one of pure oxygen, a firing tube of dense impervious polycrystalline α-alumina is inserted into the core. The firing tube in this embodiment extends about six inches beyond the furnace core at both ends thereof. During sintering, the tube-containing saggers are made to traverse the firing tube through which flows preferably an atmosphere of oxygen. A layer of friction-reducing spheres 11 are arranged to rest on the bottom of firing tube 10, along the length thereof, and in this embodiment extending onto trays 17 and 18. Means 12, such as a gas injection means, provides the firing tube, including sintering zone 13, with an oxygen atmosphere. β-alumina tube 14 is separated from sagger 15 by β-alumina powder 16. Means such as extension tray 17 with the extended layer of friction-reducing spheres 11 is used to load the tube-containing saggers, and means such as unloading extension try 18 containing extended layer of friction-reducing spheres 11 can be used for unloading the sagger. Means 19, such as a stoker mechanism, pulley or sprocket and chain, can be used for continuously pushing or stoking the tube-containing saggers 15 into and through the firing tube 10. Means 20, such as, for example, a spring-loaded retractable socket, can be used to alternately rotate the tube-containing saggers as they pass through the firing tube and also to hold together the sagger train. In this embodiment the hydrogen gas envelopes the molybdenum to prevent its oxidation. In another embodiment, where a resistance heating wire such as a platinum-rhodium alloy wire is used, no hydrogen would be necessary and the furnace core could also serve as the firing tube, and the layer of friction-reducing balls could be placed directly on the bottom of the furnace core. In a still other embodiment, the firing tube can be heated inductively using a susceptor.

The present invention is particularly useful for the production of thin-walled β-alumina sintered tubes having a wallthickness less than about 0.25 centimeter.

In carrying out the present process, a green hollow tube is shaped from β-alumina powder, or a mixture of reactant powders which produces β- and/or β''-alumina is used. Preferably, the powder or powders have an average particle size in their largest dimension less than about 5 microns, and most preferably submicron, to promote shrinkage to high densities. A number of techniques can be used to shape the powder into a green hollow tube. Preferably, the present tube is prepared by electrophoretic deposition, an example of which is disclosed in U.S. Pat. No. 3,900,381 to Powers. The green tube, preferably, should have a density of at least about 40% and preferably at least 50% of the theoretical density for β-alumina to promote densification during sintering and produce a sintered body having a density of at least 95%.

To protect the green unsintered tube and to prevent its contamination, it is positioned within a sagger. The sagger should be formed of a material which has no significant deleterious effect on the tube. The sagger is cylindrically shaped, sufficiently open at least on one end to receive the green tube, and preferably, it is sufficiently closed on the opposite end to prevent loss of the tube therewithin. The sagger should have a volume sufficient to accommodate the green tube in its horizontal position. Normally the wall thickness of the sagger ranges from about 2 millimeters to about 4 millimeters.

For producing the present β-alumina tubes the sagger is usually an α-alumina tube but it can be made of β-alumina. Specifically, to carry out the present alternate rotation, a green β-alumina tube is placed inside a sagger, usually an α-alumina tube, along with a small amount of β-alumina bedding powder of approximately the same composition as the green tube. The main purpose of the bedding powder is to inhibit loss of $Na_2O$ from the green tube. Alternatively β-alumina saggers may be used with or without bedding.

In the present invention, a horizontal or a substantially horizontal sintering or firing tube open at both ends is used. The inner surface portion or wall of the firing tube should be composed of a material which has no significant deleterious effect on the sintered product. Preferably, such inner surface of the sintering or firing tube is formed of polycrystalline α-alumina.

A layer of friction-reducing spheres or balls is positioned on the bottom, i.e. on the surface along the length of the lower portion of the substantially horizontally disposed firing tube. The layer of spheres or balls should be at least sufficiently large to prevent any significant direct contact of the saggers with the firing tube as the saggers are advanced and rotated through the firing tube. The spheres should be sufficiently large so as not to lodge in any cracks which might be present in the wall of the firing tube. The maximum size of the spheres is limited by the dimensions of the systems, i.e. the size of the firing tube and the tubes being sintered. As a practical matter, the spheres may range from about 1.5 millimeters to about 10 millimeters in diameter. Spheres of the same or substantially the same size should be used in carrying out the present process. The spheres should have a smooth or at least a substantially smooth surface to promote reduction of friction. Also, the spheres should be formed of a material which has no significant deleterious effect on the present process. Preferably, for the production of β-alumina sintered tubes, the spheres are formed of polycrystalline α-alumina or zirconia.

As the tube-containing sagger is passed through the firing tube, in the lower portion of the firing tube it contacts the spheres rather than the wall of the firing tube, and the advancing rotating sagger turns the spheres thereby eliminating or substantially eliminating the friction that would have been produced by direct contact with that portion of the firing tube wall. The spheres also prevent breakage of the saggers as well as the firing tube.

The firing tube is provided with an atmosphere which has no significant deleterious effect on the tube being sintered. For producing sintered β-alumina tubes, the atmosphere in the firing tube should be a non-reducing dry atmosphere, and preferably an atmosphere having a dew-point less than about $-20°$ C. Preferably, an atmosphere of oxygen is used. For producing the present β-alumina tubes, sintering temperatures may range from about 1525° C. to about 1825° C.

Preferably, and as a practical matter, a plurality of the tube-containing saggers are passed through the firing tube in a train as shown in FIG. 1. A train of saggers can be arranged with the closed end of a sagger inserted into the open end of the one ahead of it in the train. The train extends out both ends of the furnace onto extension means such as extension trays. The extension trays can be, for example, constructed of stainless steel tubing cut length-wise into half-cylinders. With the train arrangement, saggers can be pushed through the furnace by a stoking machine operating at room temperature outside the furnace. Preferably, the train is compressed slighly, and rotation of the saggers is accomplished by another device which also operates at room temperature outside the furnace. Such rotation is accomplished, preferably by a motor-driven rotating socket-like arrangement which fits about the closed end of the lead sagger in the train. Other rotation schemes can also be used. For example, driver wheels can be used to rotate one sagger and thus the whole train. The driven sagger can be located at either the exit or the entrance end of the furnace.

β-alumina tubes are sintered to a density of at least about 95% of the theoretical density for β-alumina for use as an electrolyte. Most preferably, the density of the sintered β-alumina tubes is higher than about 98% of the theoretical density for β-alumina.

The preferred embodiment of equal rotational amplitudes is illustrated in FIGS. 2 and 3. Specifically, as shown by FIG. 2, the tube to be sintered 30 contained within a sagger (not shown here) is initially turned, e.g. rotated, from arbitrarily predetermined position or point 31 to make a ½ turn, e.g. a 180° turn, as shown by arrow 32 directly followed by a counter-rotation as shown by arrow 33 which, as measured from the stopping point of the preceding rotation, is substantially equal to a ½ turn or 180°.

FIG. 3 shows rotation of the tube to be sintered 40 from arbitrarily predetermined position or point 41 to make a complete revolution, i.e. 360°, as shown by arrow 42 directly followed by a counter-rotation as shown by arrow 43 to again make a complete revolution as measured from arbitrarily chosen point 41.

In the second embodiment of the present invention, the rotational amplitude of the tube to be sintered in one direction, i.e. a first direction, differs from that of the counter-rotation by at least about a ¼ turn, e.g. about 90°. All rotations in one direction, i.e. the first direction, of the tube to be sintered are equivalent to each other, and all counter-rotations are equivalent to each other.

This embodiment is illustrated by FIG. 4 where the tube to be sintered 50 contained within a sagger (not shown here) is initially rotated a ¼ turn as shown by arrow 52 from an arbitrarily chosen position or point 51 to a first stopping point 53, directly followed by a counter-rotation of a ½ turn of the tube, as shown by arrow 54 to a second or counter stopping point 55, the span of the counter-rotation being measured from the first stopping point 53. Each succeeding rotation in the first direction is measured from the preceding stopping point of the counter-rotation, and each succeeding counter-rotation is measured from the preceding stopping point of the rotation in the first direction.

The invention is further illustrated by the following examples:

EXAMPLE 1

$\beta$-alumina powder, having an average crystalline size of less than about 5 microns in its largest dimension, was formed into a green hollow tube having a density of 55% of theoretical. The green tube had an inner diameter of about 3.0 centimeters, a wall thickness of about 0.2 centimeter, a length of about 47 centimeters and was upon at one end and closed at the opposite end.

The polycrystalline $\alpha$-alumina sagger was open at one end and closed at the opposite end, had an inner diameter of about 4.4 centimeters, a wall thickness of about 0.3 centimeter and a length of about 61 centimeters.

A layer of $\beta$-alumina powder of about the same composition as the green tube was deposited along the length of the lower portion of the horizontally-disposed sagger, and the green $\beta$-alumina tube was positioned horizontally within the sagger being separated from the lower portion thereof by the powder. A plurality of such structures, i.e. powder-tube-containing saggers were prepared.

The equipment used was substantially the same as shown in FIG. 1 wherein the furnace core was made of porous $\alpha$-alumina and the furnace firing tube was made of polycrystalline $\alpha$-alumina sufficiently dense to prevent penetration by the hydrogen. The sintering zone was about 18 centimeters in length and was located aobut midway between the ends of the firing tube. The friction-reducing spheres were polycrystalline $\alpha$-alumina, about 0.7 centimeter in diameter, and having a smooth surface. A layer of such spheres covered the surface of the lower portion of the firing tube along the entire length thereof as shown in FIG. 1.

The sintering atmosphere was oxygen with a dewpoint of less than $-20°$ C., and it was introduced into the firing tube at a rate of about 8 liters per minute. The sintering temperature was about 1650° C.

A train of connecting saggers were formed by fitting the closed end of one tube-containing sagger into the open end of the next tube-containing sagger. As a sagger in the train entered and passed through the firing tube, it was continuously alternately rotated uniformly by rotating the leading sagger by a motor driven socket and arm arrangement as shown by 20 in FIG. 1. Specifically, each sagger was rotated about 360° in one direction and counter-rotated about 360° as shown in FIG. 3. Such alternate rotation of the sagger was sufficient to rotate the tube within the sagger about 360° in one direction and about 360° in the opposite direction. It was determined that there was about one complete pair of rotations, i.e. one rotation and one counter-rotation, of the tube within the sagger per one centimeter of advancing travel. The train of saggers passed through the firing tube on the layer of friction-reducing spheres at a rate of about 2 centimeters per minute.

Each of the resulting sintered tubes was comprised of a mixture of $\beta$ and $\beta''$-alumina with the $\beta$-form being present in major amount and each had a density higher than 98% of the density for $\beta$-alumina. The sintered tubes had no significant ovality or out-of-roundness, and each sintered tube was of substantially uniform shape. The wall thickness of each sintered tube was about 0.2 centimeter.

These sintered tubes were useful as electrolyte in a sodium-sulfur battery.

EXAMPLE 2

The procedure used in this example was the same as that set forth in Example 1 except for the alternate rotation of the tube-containing sagger. In this example, the sagger was initially rotated, from an arbitrarily chosen point on its circumference to make about a ¾ turn, i.e. about a 270° turn, in a first direction to a stopping point, and then measuring from this first direction stopping point, it was counter-rotated about a ½ turn, i.e. about a 180° turn. This alternate rotation of the sagger caused the tube within the sagger to alternately rotate about 270° and counter-rotate about 180°. This alternate rotation was repeated and was continuous with each succeeding rotation being equivalent to about 270° and being measured from the stopping point of the preceding counter-rotation. Also, each succeeding counter-rotation was equivalent to about 180° and was measured from the stopping point of the preceding rotation. It was determined that there was about one complete pair of rotation, i.e. a completed alternate rotation comprised of one rotation of about 270° and one counter-rotation of about 180°, of the tube within the sagger per centimeter of advancing travel.

The resulting sintered tubes were comprised of a mixture of $\beta$ and $62''$-alumina with the $\beta$-form being present in major amount and each had a density higher than 98% of the density for $\beta$-alumina. The sintered tubes had no significant ovality or out-of-roundness, and each sintered tube was of substantially uniform shape. The wall thickness of each sintered $\beta$-alumina tube was about 0.2 centimeter.

These sintered $\beta$-alumina tubes were useful as electrolyte in a sodium-sulfur battery.

EXAMPLE 3

The procedure used in ths example was the same as that set forth in Example 2 except that the leading sagger was alternately rotated to rotate about a ¼ turn, e.g. about 90°, and then measuring from the stopping point of such rotation, it was counter-rotated about a ½ turn, e.g. about 180°. This alternate rotation of the sagger caused the tube within the sagger to alternately rotate about 90° and counter-rotate about 180°. It was determined that there was about one complete pair of rotations, i.e. one completed alternate rotation comprised of one rotation of about 90° and one counter-rotation of about 180°, of the tube within the sagger per one centimeter of advancing travel.

This alternate rotation was continuous and was repeated with each succeeding rotation being equivalent to about a ¼ turn or about 90°, and being measured from the stopping point of the preceding counter-rotation. Also, each succeeding counter-rotation was equivalent to about 180° and was measured from the stopping point of the preceding rotation.

The resulting sintered tubes were comprised of a mixture of $\beta$ and $\beta''$-alumina with the $\beta$-form being present in major amount, and each sintered tube had a density higher than 98% of the density for $\beta$-alumina. The sintered tubes had no significant ovality or out-of-roundness, and each sintered tube was of substantially uniform shape. The wall thickness of each sintered tube was about 0.2 centimeter.

These sintered tubes were useful as electrolyte in a sodium-sulfur battery.

Ser. No. 180,600, filed Aug. 25, 1980 entitled PRODUCTION OF $\beta$-ALUMINA CERAMIC TUBES filed of even date herewith in the names of R. W. Powers and S. P. Mitoff and assigned to the assignee hereof discloses the production of a sintered $\beta$-alumina hollow tube of uniform shape by placing the unsintered tube within a sagger, passing the sagger on friction-reducing balls through a horizontal firing tube and rotating the tube-containing sagger through the firing tube.

What is claimed is:

1. A method for producing a sintered polycrystalline ceramic hollow cylindrical tube open at least on one end without significant out-of-roundness which comprises shaping ceramic powder into a hollow green cylindrical tube, providing a cylindrical sagger open at least on one end and having an inner volume at least sufficient to accommodate said green tube substantially horizontally and allow said tube to rotate therein, disposing said green tube substantially horizontally within said sagger, providing a substantially horizontally disposed open-ended firing tube containing a sintering zone, positioning a layer of friction-reducing spheres on the surface of the lower portion of said horizontally-disposed firing tube along the length thereof, providing said firing tube with an atmosphere which has no significant deleterious effect on said tube being sintered, heating said sintering zone to sintering temperature, passing said tube-containing sagger through said firing tube on said spheres, continuously and simultaneously advancing and alternately rotating said tube-containing sagger through said firing tube so that all portions of said tube therewithin are subjected to at least substantially the same gravitational effect, said advancement and alternate rotation having no significant deleterious effect on said tube therewithin, one completed alternate rotation being comprised of a rotation and a counter-rotation in predetermined amounts, the angles of all said rotations being substantially equal, the angles of all said counter-rotations being substantially equal, the rate of said alternate rotation being at least sufficient to make at least one completed alternate rotation of said tube within said sagger in an advancing distance equivalent to the outer circumference of said tube within said sagger, said tube-containing sagger being advanced through said sintering zone at a rate at least sufficient to sinter said tube therewithin.

2. A method according to claim 1 wherein a train of connecting tube-containing saggers is passed through said firing tube.

3. A method according to claim 1 wherein said alternating rotation of said tube-containing sagger alternately rotates said tube therein about 180° in one direction and about 180° in the opposite direction.

4. A method according to claim 1 wherein said alternate rotation of said tube-containing sagger alternately rotates said tube therewithin about 360° in one direction and about 360° in the opposite direction.

5. A method according to claim 1 wherein said alternate rotation of said tube-containing sagger alternately rotates said tube therewithin in an amplitude in one direction which differs from the amplitude in the opposite direction, at least one of said rotational amplitudes being an integral multiple of 180° and the difference between said alternating rotational amplitudes being at least about 90°.

6. A method according to claim 1 wherein said alternate rotation of said tube-containing sagger alternately rotates said tube therewithin in an amplitude in one direction which differs from the amplitude in the opposite direction, neither of said alternating rotational amplitudes being an integral multiple of 180° and the difference between said alternating rotational amplitudes being at least about 90° but not an integral multiple of 180°.

7. A method for producing a sintered polycrystalline cylindrical hollow tube open at least on one end of $\beta$-alumina, $\beta''$-alumina and mixtures thereof without significant out-of-roundness which comprises shaping a green hollow cylindrical tube from $\beta$-alumina powder or a mixture of reactant powders which react to produce $\beta$- and/or $\beta''$-alumina at an elevated temperature below or at sintering temperature, said green tube being open at least on one end, providing a cylindrical sagger open at least on one end and having an inner volume at least sufficient to accommodate said green tube substantially horizontally and allow said tube to rotate therein, disposing said green tube substantially horizontally within said sagger, providing a substantially horizontally-disposed open-ended firing tube containing a sintering zone, positioning a layer of friction-reducing spheres on the surface of the lower portion of said horizontally-disposed firing tube along the length thereof, providing said sintering zone with a non-reducing dry atmosphere which has no significant deleterious effect on said tube being sintered, heating said sintering zone to a sintering temperature ranging from about 1525° C. to about 1825° C., passing said tube-containing sagger through said firing tube on said spheres, continuously and simultaneously advancing and alternately rotating said tube-containing sagger through the firing tube so that all portions of said tube therewithin are subjected to at least substantially the same gravitational effect, said advancement and alternate rotation having no significant deleterious effect on said tube therewithin, one completed alternate rotation being comprised of a rotation and a counter-rotation in predetermined amounts, the angles of all said rotations being substantially equal, the angles of all said counter-rotations being substantially equal, the rate of said alternate rotation being at least sufficient to make at least one completed alternate rotation of said tube within said sagger in an advancing distance equivalent to the outer circumference of said tube within said sagger, said tube-containing sagger being advanced through said sintering zone at a rate appropriate to sinter said tube therewithin to a density of at least 95% of the theoretical density of $\beta$-alumina.

8. A method according to claim 7 wherein said alternating rotation of said tube-containing sagger alternately rotates said tube therein about 180° in one direction and about 180° in the opposite direction.

9. A method according to claim 7 wherein said alternate rotation of said tube-containing sagger alternately rotates said tube therewithin about 360° in one direction and about 360° in the opposite direction.

10. A method according to claim 7 wherein said alternate rotation of said tube-containing sagger alternately rotates said tube therewithin in an amplitude in one direction which differs from the amplitude in the opposite direction, at least one of said rotational amplitudes being an integral multiple of 180° and the difference between said alternating rotational amplitudes being at least about 90°.

11. A method according to claim 7 wherein said alternate rotation of said tube-containing sagger alternately rotates said tube therewithin in an amplitude in one direction which differs from the amplitude in the opposite direction, neither of said rotational amplitudes being an integral multiple of 180° and the difference between said alternation rotational amplitudes being at least about 90° but not an integral multiple of 180°.

12. A method according to claim 7 wherein said sagger consists essentially of polycrystalline α-alumina.

13. A method according to claim 12 wherein said sagger contains β-alumina powder.

14. A method according to claim 7 wherein said sagger consists essentially of polycrystalline β-alumina.

15. A method according to claim 7 wherein a train of connecting tube-containing saggers is passed through said firing tube.

16. A method according to claim 7 wherein said sagger is passed through the sintering zone at a rate ranging from about ¼ inch per minute to about 4 inches per minute.

17. A method according to claim 7 wherein said spheres range in diameter from about 1.5 millimeters to about 10 millimeters.

18. A method according to claim 7 wherein said sintered tube has a wall thickness less than 0.25 centimeter.

19. A method according to claim 7 wherein said atmosphere is oxygen with a dewpoint less than about $-20°$ C.

20. An electrolyte consisting essentially of a sintered polycrystalline uniformly hollow tube having a thickness less than about 0.25 centimeter comprised of a material selected from the group consisting of β-alumina, β''-alumina and mixtures thereof, and produced by the process of claim 7.

* * * * *